Feb. 20, 1940.                E. J. HICKS                2,191,388
                             SAFETY HUB CAP
                        Filed Oct. 17, 1938           2 Sheets-Sheet 1

Inventor
Earl J. Hicks

By Clarence A. O'Brien
and Hyman Berman
Attorneys

Feb. 20, 1940. E. J. HICKS 2,191,388
SAFETY HUB CAP
Filed Oct. 17, 1938  2 Sheets-Sheet 2
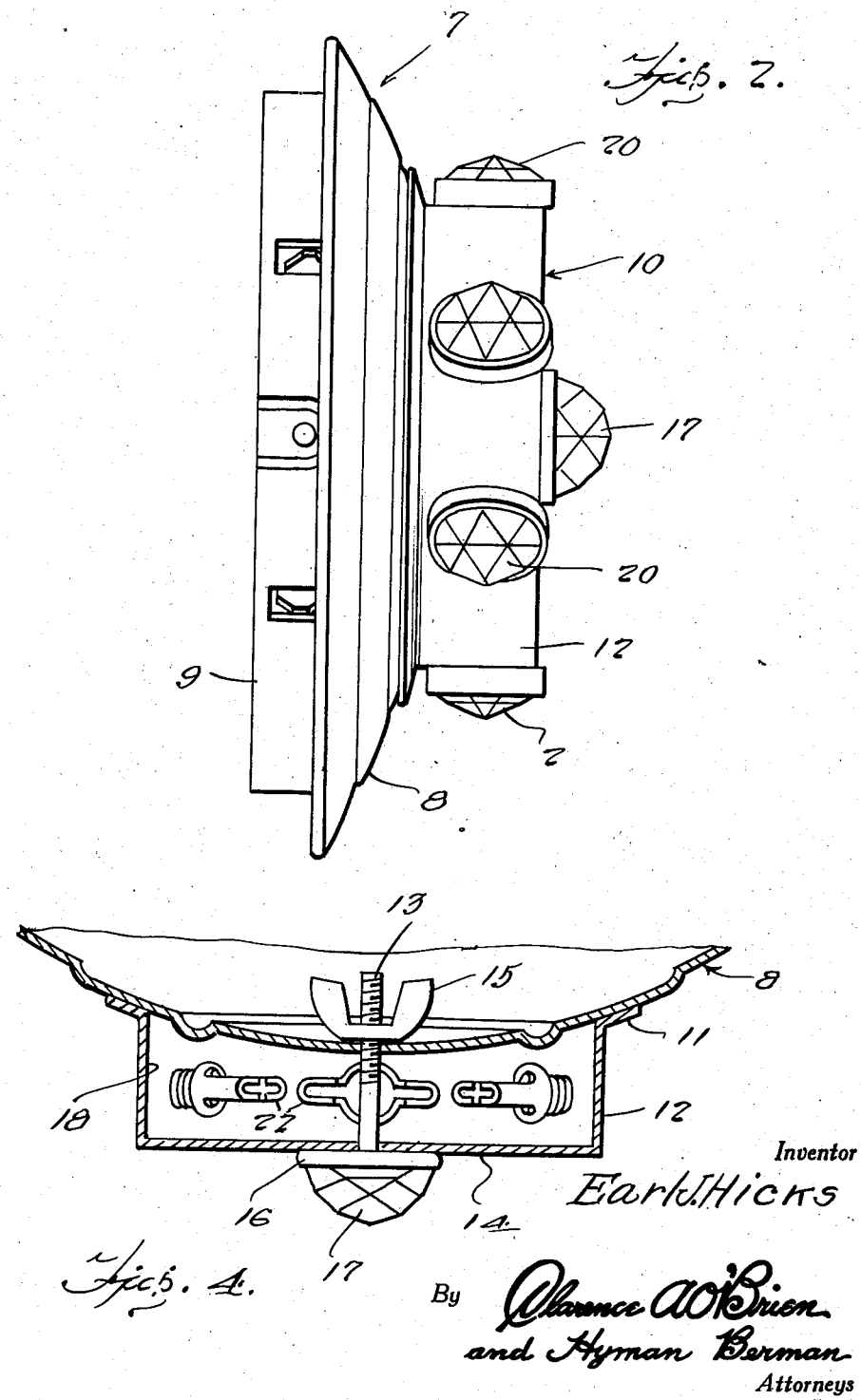

Patented Feb. 20, 1940

2,191,388

UNITED STATES PATENT OFFICE 2,191,388

SAFETY HUB CAP

Earl J. Hicks, Gouverneur, N. Y., assignor of one-half to Floyd G. Denesha, Dekolb, N. Y.

Application October 17, 1938, Serial No. 235,520

1 Claim. (Cl. 88—81)

My invention relates generally to a safety hub cap for automobiles and other road vehicles, and particularly to a hub cap of this character which involves a circumferential distribution of light reflecting jewels and an axially arranged light reflecting jewel, all so arranged that vehicle clearance, direction of vehicle motion and other vehicle maneuvers are clearly indicated to approaching, following, and laterally situated drivers of other automobiles at night and at other times, and driving safety thereby greatly promoted and traffic rendered more orderly, and an important object of my invention is to provide an efficient and relatively inexpensive arrangement of this character which is practical, and susceptible of general use.

Other important objects and advantages of my invention will be apparent from a reading of the following description taken in connection with the drawings, wherein for purposes of illustration I have shown a preferred embodiment of my invention.

In the drawings:

Figure 2 is an enlarged edge elevational view of the hub cap removed from the wheel.

Figure 4 is a transverse vertical sectional fragmentary view taken through a hub cap in accordance with the present invention.

Figure 1:
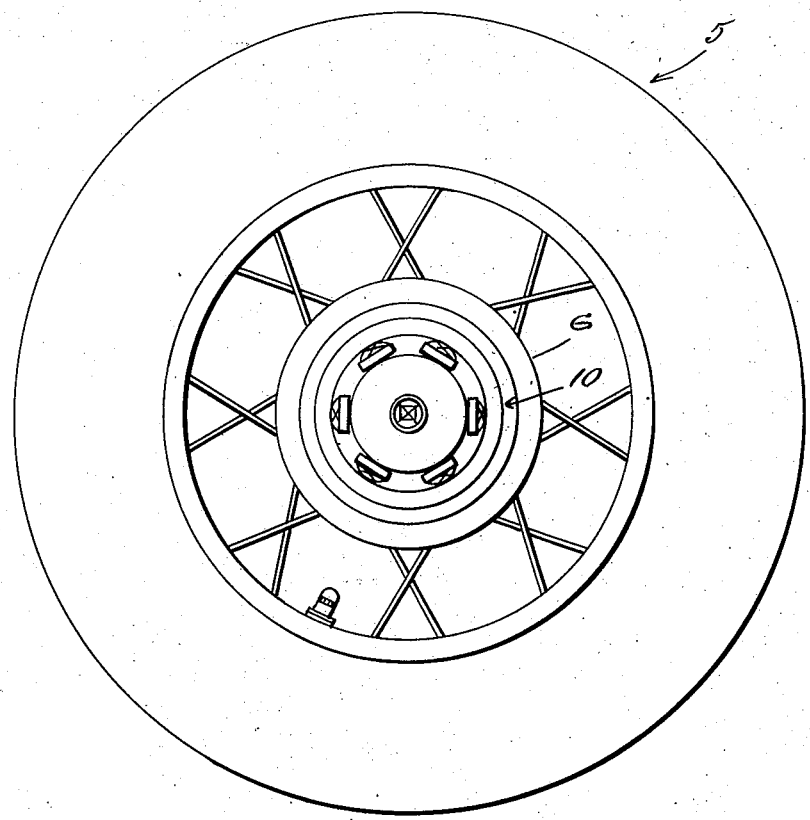
Figure 1 is a general elevational view of the outboard side of an automobile wheel showing a hub cap in accordance with the invention associated therewith.
Figure 3:
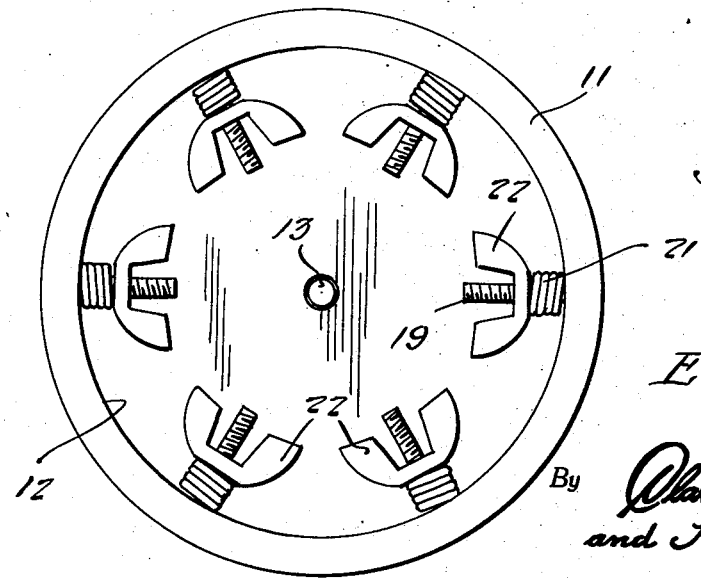
Figure 3 is an inboard elevational view of the jeweled attachment.

Referring in detail to the drawings, the numeral 5 generally designates a conventional type of vehicle wheel such as an automobile wheel, the same being possessed of a hub 6 on which is mounted the hub cap 7 in accordance with the present invention. The body of the hub cap may be an annular form 8 of any suitable design and possessed of the usual attaching annulus 9 projecting from the inboard side thereof. In accordance with the present invention there is attached to the outboard side of the hub cap body 8, the jewel equipped unit which is generally designated 10 by any suitable means, as by brazing or welding or otherwise attaching a flange 11 to the exterior of the hub cap body 8 as illustrated in Figure 4 of the drawings. On the flange is a flat cylindrical casing 12 which carries the light reflecting jewels, and if desired this shell 12 may be held in place on the hub cap body by means of a bolt 13 projected substantially axially through an accommodating opening in the hub cap body 8 and through the outer wall 14 of the shell 12, the bolt being provided at its inner end with a wing nut 15 and at its outboard end with a flange 16 containing the centralized light reflecting jewel 17. In the event of employment of the bolt 13 for mounting the shell 12 on the hub cap body, specific attachment means at the flange 11 will not be absolutely necessary.

At equal circumferential intervals the peripheral wall 18 of the shell 12 is pierced by openings through which pass threaded shanks 19 which have on their radially outward ends the jewels 20. A tensioning spring 21 is disposed on the shank 19 between the inner side of the peripheral wall 18 and a clamping wing nut 22 which is threaded on the bolt, whereby the jewel is held firmly in place, but is readily replaceable upon being damaged or for other reasons.

The jewels 17 and 20 may be of any suitable color, such as red or green or yellow, so that light rays caught from the headlamps of approaching or passing automobiles from any direction may be reflected to the drivers of the respective automobiles, so that the speed, the direction, and other factors of car travel may be evident to the drivers involved, without the hazards of glare.

Although I have shown and described herein a preferred embodiment of my invention, it is to be definitely understood that I do not desire to limit the application of the invention thereto, and any change or changes may be made in the materials and in the structure and arrangement of the parts, within the scope of the subjoined claim.

Having described the invention, what is claimed as new is:

A reflector assembly for attachment to a hub cap of an automobile wheel comprising a circular casing having closed and open sides, respectively, means to detachably attach said casing to said cap open side rearmost comprising a bolt disposed in said casing axially thereof for extension of one end thereof through said cap and having a wing nut on said end whereby the open side of said casing may be clamped against said cap, a reflecting head on said bolt for clamping under turning of said nut against the closed side of said casing, and a plurality of bolt-like members extending radially through the circumferential part of said casing, said members having reflecting heads adapted to be clamped against the periphery of the casing, and means on said bolts to yieldingly clamp said last heads comprising helical springs on said members inside said casing, and wing nuts on the inner ends of said members.

EARL J. HICKS.